J. B. SINGER AND A. B. LEVY.
COMBINED CARTON AND DISPLAY DEVICE.
APPLICATION FILED OCT. 14, 1916.
1,387,192.
Patented Aug. 9, 1921.
2 SHEETS—SHEET 1.
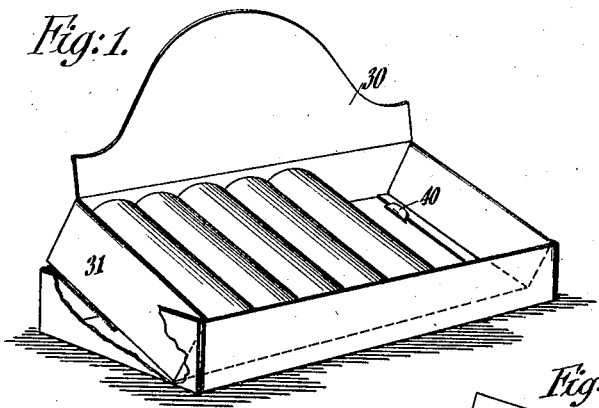
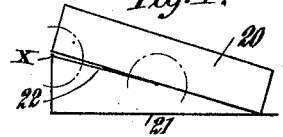
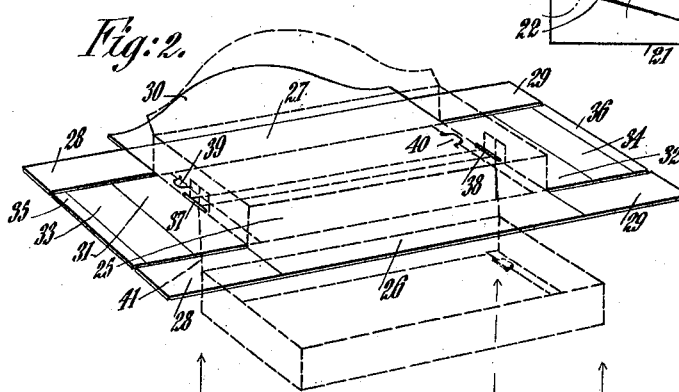
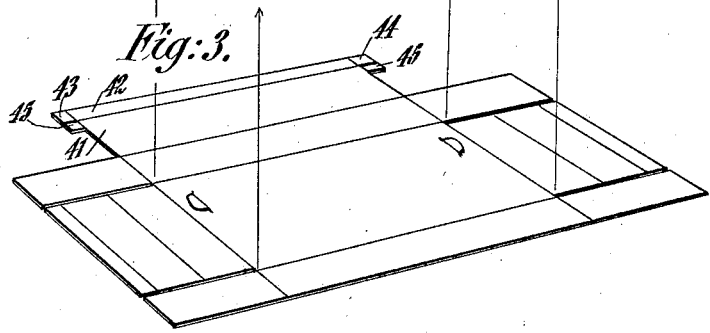
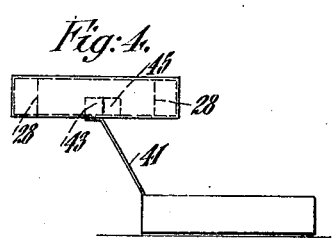
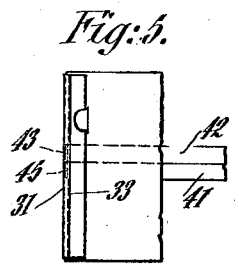
INVENTOR
Joseph B. Singer
Arthur B. Levy
BY
ATTORNEY

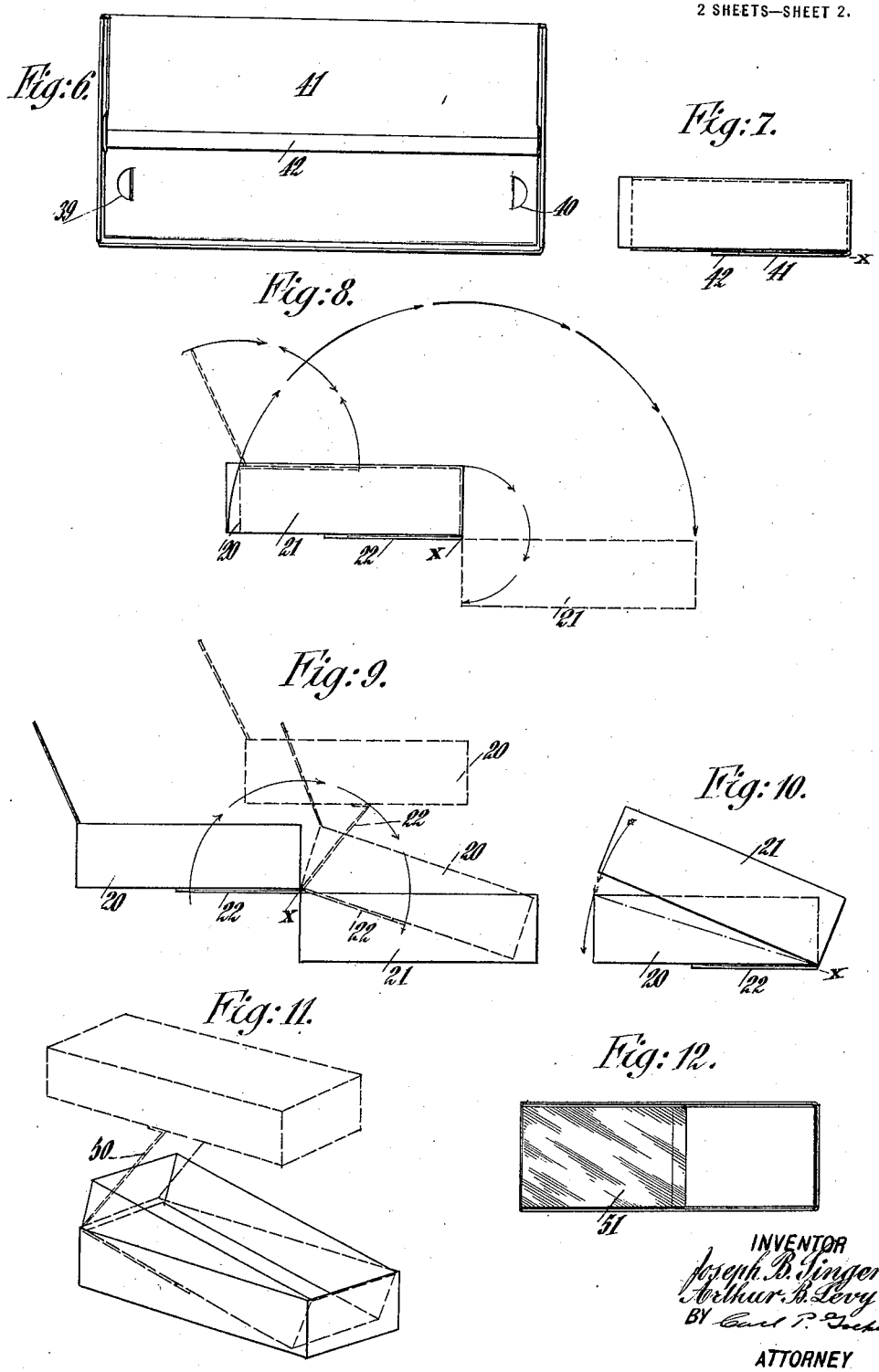

UNITED STATES PATENT OFFICE.

JOSEPH B. SINGER, OF BROOKLYN, AND ARTHUR B. LEVY, OF NEW YORK, N. Y.

COMBINED CARTON AND DISPLAY DEVICE.

1,387,192. Specification of Letters Patent. Patented Aug. 9, 1921.

Application filed October 14, 1916. Serial No. 125,575.

*To all whom it may concern:*

Be it known that we, JOSEPH B. SINGER and ARTHUR B. LEVY, citizens of the United States, the former a resident of the borough of Brooklyn, county of Kings, city and State of New York, and the latter a resident of the borough of Manhattan, city, county, and State of New York, have invented certain new and useful Improvements in Combined Carton and Display Devices, of which the following is a specification.

The present invention relates to improvements in cartons, and particularly cartons of the cover and lid type, an object of the invention being to provide such a device which in addition to its function as a container, may also be used for display purposes, and so constructed as to practically compel the proper setting up of the same, and at the same time to permit its setting up in a quick and automatic manner, with very little effort on the part of the person setting the same up. Another object is to so construct such improvements in the cartons as will greatly strengthen and reinforce the same during shipment or handling, and will form a substantial support when the carton is set up in display position. Other objects are to provide such a carton, embodying the above referred to improvements, and which will at the same time be simple in construction and economical in manufacture.

With these and other objects in view, practical embodiments of our invention are shown in the accompanying drawings, and will be hereinafter more fully described with reference thereto and finally pointed out in the claims.

In the drawings:

Figure 1 is a perspective view of our invention, with parts broken away, and showing the same in display position and with parts broken away, Fig. 1ª is a diagrammatic view showing the display position, Fig. 2 is a perspective view of the blank forming the container portion of the carton, and showing in dotted lines the manner of assembly, Fig. 3 is a perspective view of the blank forming the cover portion thereof, Fig. 4 is a side view thereof, Fig. 5 is a top view of one end of the container, Fig. 6 is a bottom view of the carton in closed position, Fig. 7 is an end view thereof, Figs. 8 and 9 are diagrammatic views showing the manner of opening and setting up the device, Fig. 10 is a diagrammatic view showing the manner of closing the same, Fig. 11 is a perspective view of a modified form of device in display position, and Fig. 12 is a bottom view thereof in closed position.

Similar reference characters indicated corresponding parts throughout the several figures of the drawings.

Referring to the drawings, and particularly to the diagrammatic drawing (Fig. 1ª), the invntion consists broadly of a containing portion 20 of a carton, a cover portion 21, which may or may not be telescoping, and a hinge portion 22 flexibly secured to the container portion at substantially the center line of the bottom, and to the cover portion at the edge of the cover, the hinge being of a length corresponding to the space between the point of connection of the hinge to the container, and the front edge thereof; in display position of the device the combined length of the hinged portion and the portion of the container extending therefrom is less than the opening of the cover portion.

When the cover is removed from the container, it is inverted so that it assumes the same position as the container. The only possible operation then, is to bring the container forward, doubling the hinge upon the bottom thereof and placing the same into the cover, as shown in Fig. 1, the hinge supporting the container in an inclined and display position. This principle may be embodied in boxes of varied shape and dimensions, either folding or nonfolding boxes.

In the drawings we have illustrated a shape of telescoping box in common use, and formed from two blanks. The blank of the container portion, shown in Fig. 2, comprises a rectangular central portion 25, provided along its longitudinal edges with the front and rear portions 26 and 27, each having extensions 28 and 29 at their ends, the upper edge of the portion 27 being provided with a display flap 30 which may be of any suitable outline. At the ends of the central portion 25 there are provided extensions 31 and 32, and to these are provided further and similar extensions 33 and 34. Narrow end flaps 35 and 36 are provided respectively at the ends of the extensions 33 and 34. Slots 37 and 38 are provided at each end of the central portion 25, and also there are provided semicircular or other suitably formed cuts 39 and 40, forming holding lugs, hereinafter referred to.

The blank for the cover portion is similar to the blank for the container, with the exception of a slight difference in the dimensions hereinafter referred to, and the slots 37 and 38 are dispensed with. Also, the display flap 30 is replaced by a rectangular flap 41, which constitutes the hinge. The hinge is provided at its upper edge with an attachment flap 42, at the ends of which are provided flaps 43 and 44, each provided with an extension 45. The lines of division between the different sections are suitably scored, and those lines between the hinge and the cover and the hinge and the attachment flap 42, are scored in such manner as to make the same freely flexible in either direction.

In setting up the device the cover portion is first made up by bending the front and rear portions up from the central portion, and bending the end flaps inwardly. These flaps are then inclosed by bending the extensions at the ends of the central portion, and are retained in this position by catching the narrow end flaps beneath the holding lugs.

The flaps 43 and 44 and their extensions 45 of the attachment flap of the hinge, are then inserted through the slots 37 and 38 by folding the extension 45 upon the flaps 43 and 44, and when so inserted are opened up, so as to be held in the slots. The container portion is then made up in a manner as above pointed out, at the same time inclosing and securely locking the flaps 43 and 44 into the ends of the folded ends of the container. In this way a very secure and substantial connection is made between the two parts of the carton and the hinge.

The container portion in addition to its being smaller in all of its dimensions to permit its insertion into the cover portion, is substantially shorter so as to permit the insertion of the container by swinging the same about the point $x$. The diagonal length of the container indicated by the dot and dash line (Fig. 10) is less than the length of the opening of the cover. This is clearly shown in Figs. 8, 9 and 10.

Fig. 8 illustrates the first position in removing the cover from the container, the dotted lines showing the necessary position assumed by the cover by reason of the connecting hinge. Should the device be left in this position, the container would topple over, so that the person setting up the same is literally compelled, and with very little effort to place the container in the correct position, by swinging the same with the hinge upwardly, forwardly and into the cover, the set up position and an intermediate position being clearly shown in dotted lines.

In the set up position, it will be seen, the device forms a very attractive display for cases, show-windows and the like, the hinge effectively supporting and preventing the rear end of the box from entering the cover, and preventing the cover from being thrown away or lost. Fig. 10 clearly indicates the manner of closing the device.

In Figs. 11 and 12 we have shown our invention as applied to the short dimension of a carton, the operation being the same as the above described form. The hinge 50 is secured to the container and cover by means of a piece of gummed paper 51. It will be understood that the hinge may be formed and attached in numerous other ways, and instead of being solid, may be in the form of one or a plurality of struts.

We have illustrated and described preferred and satisfactory forms of our invention, but it is obvious that changes may be made therein within the spirit and scope thereof, as defined in the appended claims.

We claim:

1. An improved display carton, comprising a container portion, a cover portion adapted to have its open side moved into engagement with the bottom of said container portion to constitute a support therefor, one end of said container portion adapted to rest on the base of said cover portion, the other end thereof adapted to rest upon the edge of one end of said cover portion, and a hinged member connecting said container portion and said cover portion, and adapted to guide the movement of said cover into supporting position, said hinged member in display position extending beneath and engaging the bottom of said container portion, and forming with said end of the cover portion a rest for the container portion for supporting the same in inclined position and occupying an inclined position extending below the horizontal plane of its point of connection with said cover portion.

2. An improved display carton, comprising a container portion, a cover portion, a hinged member hingedly connected at one end to the bottom of said container portion intermediately its ends, and at its other end in proximity to the edge of one end of said cover portion, said cover portion adapted to telescopically engage said container portion in closed position of said box, and adapted to have its open side moved into engagement with the bottom of said container portion to constitute a support therefor, one end of said container portion adapted to rest on the base of said cover portion, the other end adapted to rest in proximity to said end of said cover portion, said hinged member adapted to guide the movement of said cover into supporting position for display and to guide the container portion into the cover portion to completely close the box, the combined length of said hinged member and the portion of said container portion extending therefrom in the display position of said device being less than the length of the opening of said cover portion.

3. An improved display carton, comprising a container portion, a cover portion adapted to have its open side moved into engagement with the bottom of said container portion to constitute a support therefor, the diagonal length of said container portion being less than the length of the opening of said cover portion, one end of said container portion adapted to rest on the base of said cover portion, the other end thereof adapted to rest upon the edge of one end of said cover portion, and a hinged member connecting said container portion and said cover portion, and adpted to guide the movement of said cover portion into supporting position.

4. An improved display carton, comprising a container portion, a cover portion, a hinged member, hingedly connected at one end of the bottom of said container portion intermediately its ends, and at its other end in proximity to the edge of one end of said cover portion, said cover portion adapted to telescopically engage said container portion in closed position of said box, and adapted to have its open side moved into engagement with the bottom of said container portion to constitute a support therefor, one end of said container portion adapted to rest on the base of said cover portion, the other end adapted to rest upon said end of said cover portion in proximity to which said hinged member is connected, said hinged member adapted to guide the movement of said cover into supporting position for display and to guide the container portion into the cover portion to completely close the box, said hinged member in display position occupying an inclined position extending below the horizontal plane of its point of connection with said cover portion.

In testimony that we claim the foregoing as our invention, we have signed our names in presence of a subscribing witness.

JOSEPH B. SINGER.
ARTHUR B. LEVY.

Witness:
D. LEWIS MATTERN.